Nov. 24, 1942.  W. STEHLIK  2,302,809
EGG WASHER
Filed May 31, 1941   4 Sheets-Sheet 1
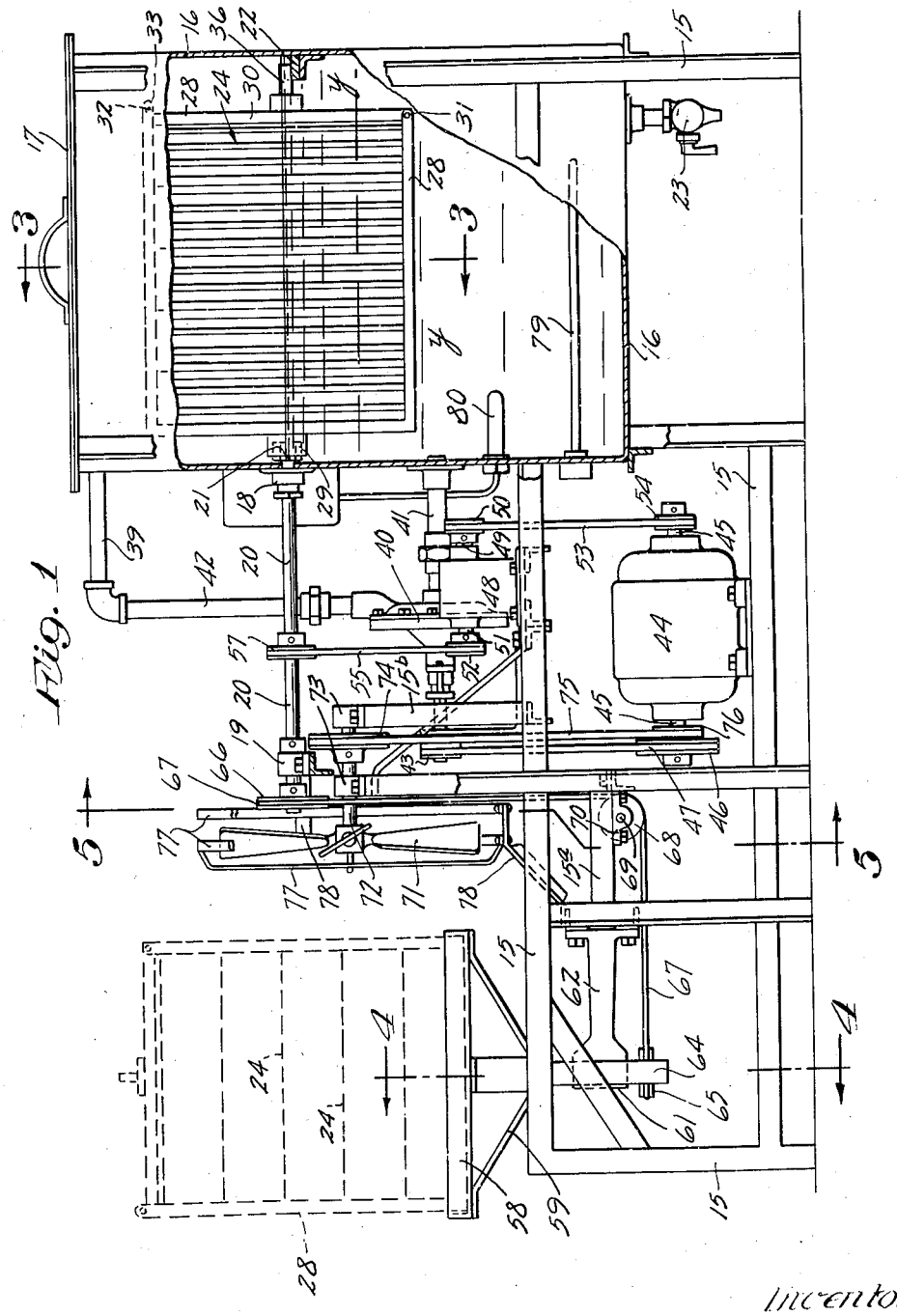
Inventor
William Stehlik
By his Attorneys

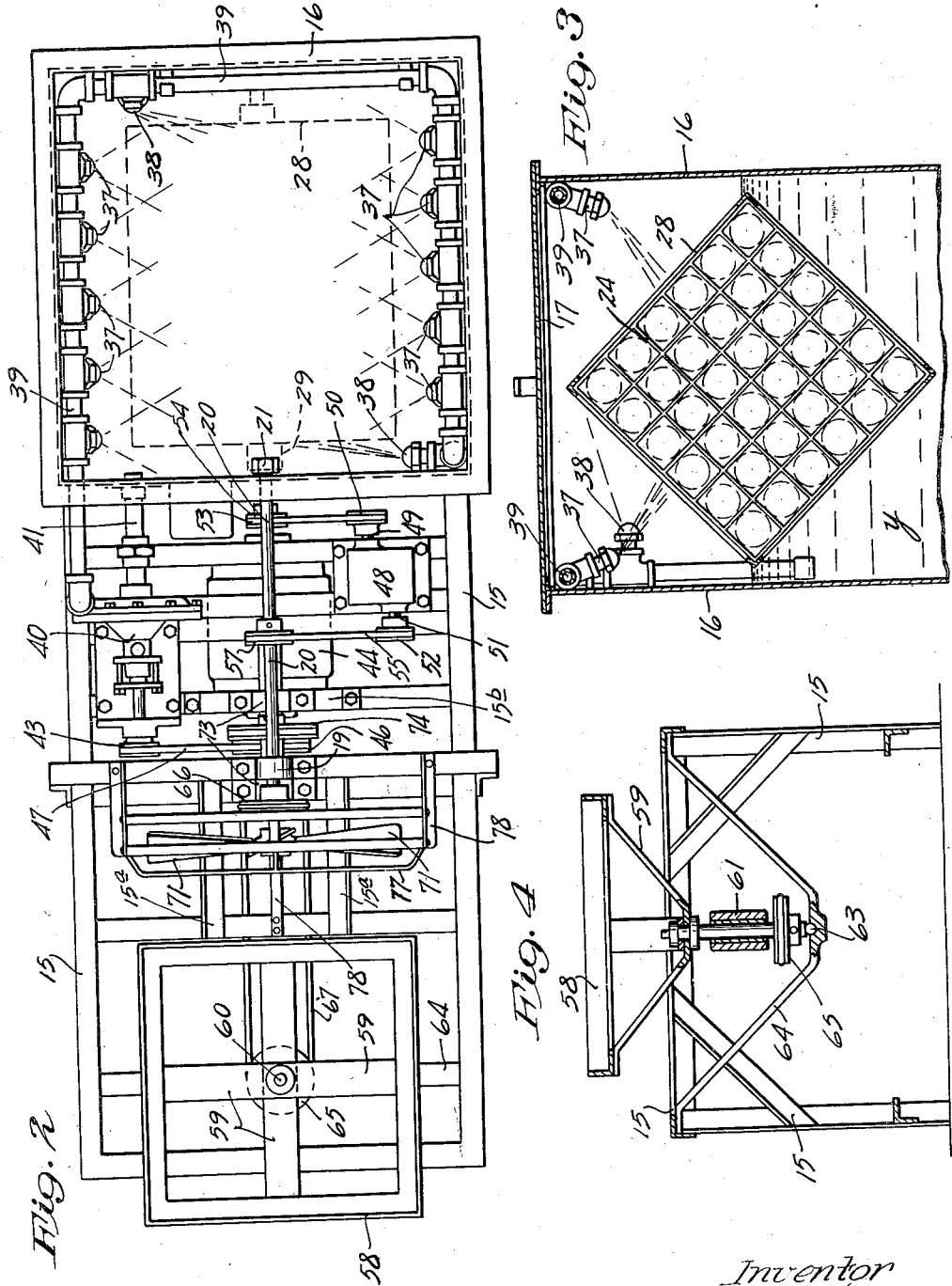

Nov. 24, 1942.  W. STEHLIK  2,302,809
EGG WASHER
Filed May 31, 1941  4 Sheets-Sheet 3
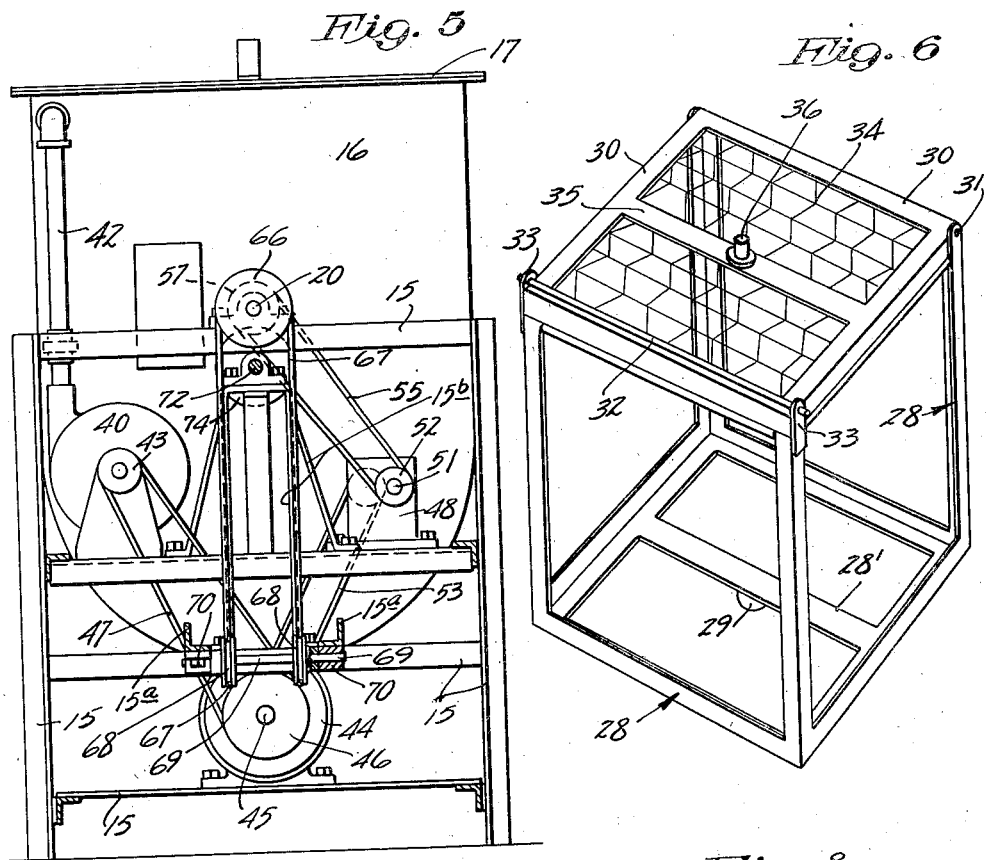
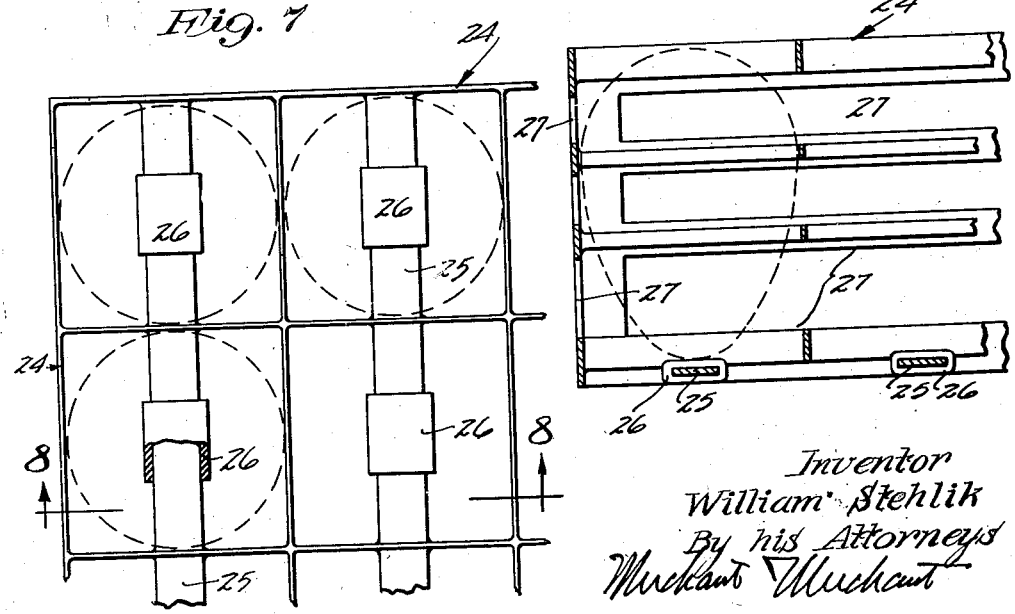
Inventor
William Stehlik
By his Attorneys
Murchant Murchant Nov. 24, 1942. W. STEHLIK 2,302,809
EGG WASHER
Filed May 31, 1941 4 Sheets-Sheet 4

Inventor
William Stehlik
By his Attorneys

Patented Nov. 24, 1942

2,302,809

UNITED STATES PATENT OFFICE 2,302,809

EGG WASHER

William Stehlik, Minneapolis, Minn., assignor of one-third to Edward Dickman, and one-third to Max Levin, both of Minneapolis, Minn.

Application May 31, 1941, Serial No. 395,975

2 Claims. (Cl. 146—198)

My invention relates particularly to the washing and drying of eggs and provides an improved machine or apparatus for such purpose. The machine, nevertheless, is capable of various other analogous uses. For convenience the machine or apparatus will hereinafter be referred to as an egg washer and drier.

The machine involves both washing and drying means and the arrangement is such that the washing and drying operations can be carried out simultaneously. The washing means involves a wash tank in which the washing or cleaning liquid is contained. The eggs are adapted to be rotated in the wash tank while being subjected to forcefully projected sprays of the water or cleaning liquid.

To hold the eggs while they are being washed, there is provided a rotary cage that includes a multiplicity of egg trays. These egg trays, in a manner hereinafter more fully described, are adapted to receive and contain one layer of eggs as they are removed from the crate and these trays, with the eggs, are adapted to be placed in the cage. The cage thus loaded with eggs is arranged to be placed in the wash tank, in a horizontal position, and rotated.

The drying means involves a table mounted to rotate on a vertical axis. After the eggs have been washed, the cage, with the washed eggs therein contained, is taken from the wash tank, turned upright and set on the rotary table. A properly positioned fan is arranged to blow a strong blast of air onto the eggs while they are being rotated. The water sprayed onto the eggs while they are being washed is, through a suitable pump and circulating connections, drawn from the wash tank and delivered back into the same.

The rotation of the egg-containing cage within the wash tank, the rotation of the drying table, the driving of the fan or blower and the operation of the pump are all from a common source, to wit: preferably an electric motor; and all of these elements are preferably supported directly from a common main frame.

Referring to the drawings, which illustrate a commercial machine and wherein like characters indicate like parts throughout the several views:

Fig. 1 is a view chiefly in side elevation, but with some parts broken away and some parts sectioned, showing the complete machine or apparatus;

Fig. 2 is a plan view of the complete machine;

Fig. 3 is a transverse vertical section taken on the line 3—3 of Fig. 1;

Fig. 4 is a transverse vertical section taken on the line 4—4 of Fig. 1;

Fig. 5 is a transverse vertical section taken on the irregular line 5—5 of Fig. 1;

Fig. 6 is a view in perspective showing the rotary egg cage with the trays removed therefrom;

Fig. 7 is a detail in plan showing a portion of one of the egg trays;

Fig. 8 is a vertical section taken on the line 8—8 of Fig. 7;

Figure 9:
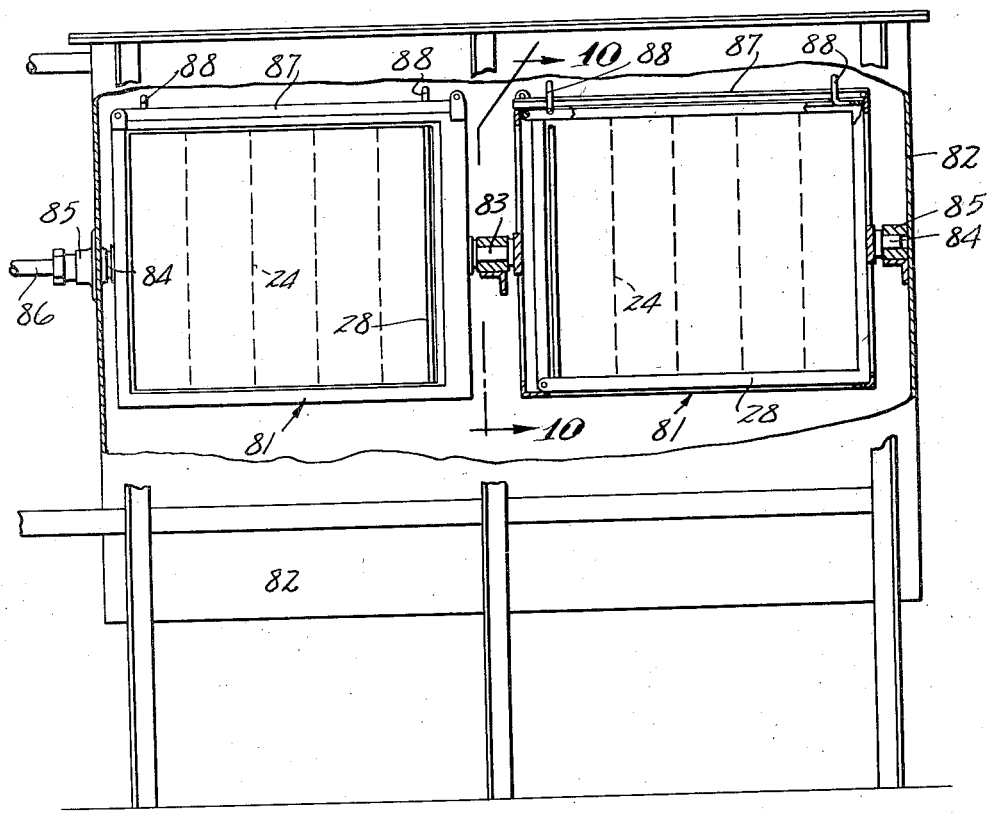
Fig. 9 is a view, partly in elevation and partly in vertical section, illustrating a duplex arrangement of the egg washing cages.

All of the parts of the machine are mounted directly or indirectly on a long main frame made up preferably of commercial angle steel bars, the said frame being indicated as an entirety by the numeral 15. Rigidly mounted on this frame, at one end thereof, is a wash tank 16 preferably a rectangular sheet metal structure shown as provided with a removable cover 17. This tank will contain the water or washing liquid to approximately the level indicated at $y$ in Fig. 1.

Journaled in a bearing 18 on one end plate of the tank 16, and in a bearing 19 on an upwardly extended portion of the main frame 15, is a shaft 20 which, within the tank, is provided with an angular coupling head 21, see particularly Figs. 1 and 2. On the interior of the opposite head plate of the tank 16 approximately in line with the bearing 18 is a notched or open bearing 22. The numeral 23 indicates a normally closed drain cock in the bottom of the tank 16.

The trays, portions of which are shown in approximately full-size in Figs. 7 and 8, are indicated as entireties by the character 24 and each, as best shown in Fig. 3, is made with thirty-six egg compartments. The tops of these egg open work compartments or cells are normally open but the bottoms are partially closed by transverse egg-supporting bars 25 preferably provided with pads 26 with which the lower ends of the eggs will be engaged. The side walls and the partitions are cut away to form large fluid passages 27.

When a layer of eggs has been removed from the egg crate the trays just described will be turned upside down and placed over the eggs and then the trays will be turned right-side up and will be ready to be placed in the so-called egg cage shown in detail in Fig. 6.

This egg cage is a skeleton-like rectangular structure of a size to receive the desired number of trays 24 and which, in practice, are usually made of a size to receive five such trays. One of the walls of the cage, indicated by the numeral 28, has a cross bar 28' which, at its central portion, has a hub 29 formed with an angular internal socket adapted to receive the angular head 21 of shaft 20 and the opposite wall or side of cage 28 is in the form of a rectangular frame 30 that is hinged to the cage 28 at 31 and is adapted to be locked to said cage by a lock rod 32 inserted through ears 33 on said cage, as best shown in Fig. 6. When the loaded trays, assumed to be five in number, are placed in the cage, they will be placed one on top of the other open sides up and the open top of the highest tray will be close to the hinged member 30. To confine the eggs in this upper tray the frame 30 is shown as provided with a woven wire screen 34. Said frame 30 has a transverse bar 35 which, at its central portion, has a projecting trunnion 36. When the cage has been loaded with egg filled trays while, of course, the frame 30 is locked, the cage will be turned into a position with its trunnion 36 and coupling socket 29 in a common horizontal line; and the cage will then be placed in the wash tank with its socket 29 telescoped onto the head 21 of shaft 20 and with its trunnion 36 seated in the open bearing 22.

When the loaded cage is rotated, the lower portion thereof and part of the eggs will always be submerged in the washing liquid $y$ and liquid sprays will be projected through the cage and trays and onto the eggs from various different directions from nozzles 37 and 38. All of the nozzles 37 and 38 open laterally from a pipe 39 that extends in rectangular formation around the interior of the wash tank 16 above the water level.

The cleaning liquid is drawn from the wash tank and forced to the pipe 39 from a pump 40, the casing of which is rigidly supported on the main frame 15. A pipe 41 connects the intake of the pump casing to the tank 16 and the tangential discharge port of said pump is connected to pipe 39 by a delivery pipe 42. The rotor shaft of pump 40 is extended from the pump casing and is provided with a pulley 43. As already stated, the motive power for all of the running parts of this machine will be supplied from a motor. The frame 44 of this motor is suitably supported on the base frame 15 and its rotor shaft 45, at one projecting end, is provided with a driving pulley 46 over which and the pulley 43 runs a belt 47 to drive the rotor of pump 40 quite directly from said motor.

The above noted shaft 20 is also driven from motor 44 but at a greatly reduced speed through transmission mechanism which will include a conventional reduction gear contained in a housing 48 mounted on the main frame 15. This conventional reduction gear includes a driven shaft 49 equipped with a pulley 50 and a driven reduced speed shaft 51 equipped with a pulley 52, as best shown in Fig. 1. Pulley 50 is driven from a belt 53 that runs over a pulley 54 on one projecting end of the rotor shaft 45 of motor 44; and slow speed shaft 51 drives shaft 20 through a belt 55 that runs over the pulley 52 on shaft 51 and over a pulley 57 on said shaft 20.

With the connections described, it is evident that shaft 20, and hence the loaded egg cage, will be rotated at a slow speed when the apparatus is in operation. The rotary table 58 is a flanged rectangular structure of a size to receive the lower end of the cage 28 when the latter, with its load of washed eggs, is placed thereon. As best shown in Figs. 2 and 4 this table 58 is in the form of a rim or frame made of angle iron that is directly supported by a downwardly converging spider bracket 59 that is rigidly connected to the upper end of a short vertical shaft 60 that is journaled in a bearing 61 formed as one end of a heavy arm or bracket 62 that is rigidly secured to certain of the cross bars of the frame 15. At its extreme lower end the shaft 60, by means of a thrust bearing 63, is seated on a depending spider-like bracket 64 that is, in turn, rigidly secured to the frame work 15, as best shown in Fig. 4. Just above the thrust bearing 63 shaft 60 is provided with a pulley 65. Rotary table 58 is arranged to be rotated from the motor 44, at a slow or reduced speed, directly from shaft 20 preferably through the following driving connections, to wit: on the extended end of shaft 20 is a pulley 66. A belt 67 runs over the pulleys 65 and 66 and over laterally spaced pulleys 68, which latter are journaled on a spindle or short shaft 69 mounted in bearings 70 secured on transverse portions 15a of the main frame 15, as best shown in Figs. 1 and 5.

A fan 71 for blowing a blast of air against the egg cage on to the table and against and around the eggs contained therein is located quite closely adjacent to one side of said table. This fan is carried by a shaft 72 journaled in bearings 73 on laterally spaced portions 15b of the main frame 15, as best shown in Figs. 1 and 5. Secured on fan shaft 72 is a pulley 74 that is driven from the motor 44 at high speed through a belt 75 that runs over said pulley 74 and over the pulley 76 secured on the shaft 45 of the rotor of the motor 44. In Figs. 1 and 2 the numeral 77 indicates an open guard placed in front of and partly around the fan 71 and suitably supported from the main frame by arms or brackets 78.

To keep the washing liquid at a predetermined proper temperature, I preferably employ an electric heating device of commercial or well-known arrangement and the parts of which, for the purpose of this case, it is only desirable to particularly note the heating element 79 and the aquastat bulb 80.

Summary of operation

The use and operation of the apparatus is probably clear from the foregoing description, but may be briefly summarized as follows: When the washing cage is loaded with eggs, as already described, it is mounted in the wash tank and rotated and the eggs will be carried through the liquid and then carried above the liquid and subjected to the sprays directed against the eggs in the several directions.

The movement of the eggs through the washing liquid will be slow but the sprays will be discharged against the eggs at high velocity, thereby carrying from the eggs any of the materials tending to adhere thereto. In practice it is found that complete and satisfactory washing of the eggs in this machine requires approximately five minutes and that the drying of the eggs can be accomplished in about two and one-half minutes. The intervening two and one-half minutes will be sufficient for the removal of the eggs from the crates and the loading of the rotary cage therewith. Hence, in the operation of this machine, the only interruption in the washing action will be only the short interval required to take one cage with the washed eggs out of the wash tank and the replacing of another cage loaded with the eggs to be washed; and, as is evident, the eggs can be dried without in any way delaying the washing action.

The loading of the trays, by the operation already described, may be very quickly performed. No direct handling of the eggs is required. By the use of inverted trays a whole layer of eggs from the crate (usually about three dozen) is performed by one operation. For the particular arrangement described, fifteen dozen eggs can be washed and dried at one time. If it should be desirable to simultaneously wash thirty dozen at one time, the tank can be enlarged and the cages duplicated.

Figure 10:
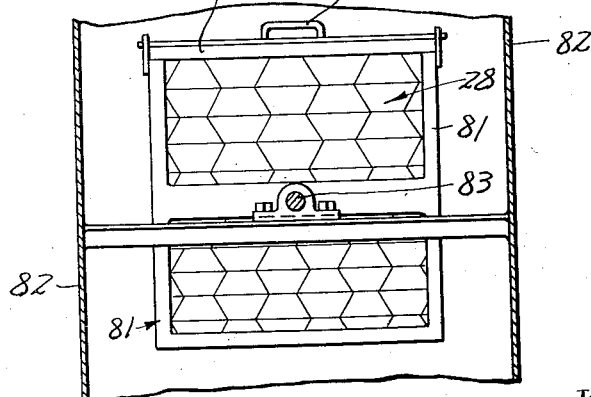
Fig. 10 is a section taken on the line 10—10 of Fig. 9.

In Figs. 9 and 10 an apparatus is shown for simultaneously rotating two of the above described cages 28 with its loaded trays therein. In this instance the loaded cages 28 are arranged to be inserted in rectangular skeleton-like or box-like carriers 81 that are mounted to rotate within a relatively large wash tank 82. These carriers 81 are connected by a short shaft 83 and at their ends have trunnions 84 journaled in bearings 85 on the interior of the tank 82. One of the trunnions 84 is connected to a driving shaft 86 that is shown in Fig. 9. Both of the box-like carriers 81 are provided with hinged sides 87 adapted to be normally latched in closed positions. In this arrangement the cages 28 are shown as provided with hand grips 88 to facilitate removal thereof when the side plate or gate 87 is open.

From the foregoing it will be understood that various alterations in the details of construction and arrangement of parts may be made within the scope of the invention herein disclosed and claimed.

What I claim is:

1. In an egg washing device, a tank having means for maintaining a water level therein, a cage containing a plurality of superposed open work egg trays each having a plurality of cells and providing a multi-cellular structure uniformly distributed therethrough for supporting eggs for treatment in the tank, means rotatably mounting the cage on a horizontal axis within the tank with cellular portions thereof disposed below and above the water level, a liquid spraying device supported in the tank to discharge a spray of liquid through successive cellular portions of the cage disposed above the water level during the rotation of the cage, and means to rotate the cage.

2. The structure recited in claim 1, with means for rotating the cage at relatively low speed within the tank, and means for delivering a spraying liquid to the spraying device under high pressure.

WILLIAM STEHLIK.